Sept. 5, 1967      D. R. POAGUE      3,339,944
TUBULAR COUPLER FOR CONDUITS
Filed Jan. 28, 1965
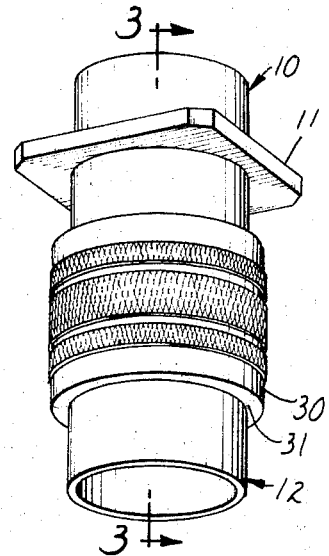
FIG. 1
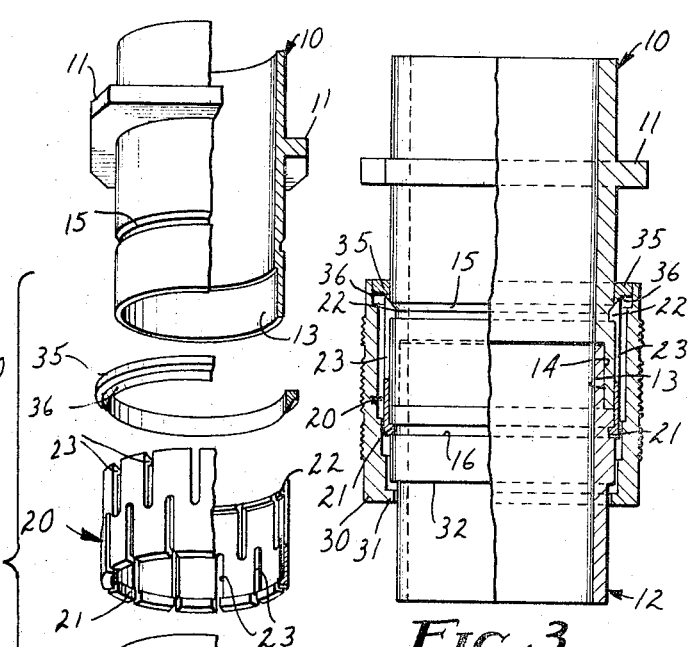
FIG. 2
FIG. 3
FIG. 4
INVENTOR.
DONALD R. POAGUE
BY
Merchant, Merchant & Gould
ATTORNEYS

United States Patent Office 3,339,944
Patented Sept. 5, 1967

3,339,944
TUBULAR COUPLER FOR CONDUITS
Donald R. Poague, Crystal, Minn., assignor to Universal Space Corporation, Washington, D.C., a corporation of the District of Columbia
Filed Jan. 28, 1965, Ser. No. 428,793
2 Claims. (Cl. 285—39)

ABSTRACT OF THE DISCLOSURE

Apparatus for coupling two tubular conduits each having a circumferential groove in the outer surface thereof spaced from the end to be coupled, including a locking sleeve with an inner diameter approximately equal to the outer diameter of the tubular conduits and having two inwardly projecting flanges adapted to engage in the grooves in the conduit when the conduits are placed in coaxial mating positions. One end of the locking sleeve has a radially outwardly directed cam surface and the locking sleeve further has longitudinal grooves therein so that the end is formed into a plurality of fingers, which can be forced radially outwardly to disengage them from the groove in the conduit. An actuating sleeve is mounted coaxially over the locking sleeve for limited axial movement along the coupled conduits. The actuating sleeve has a radially inwardly directed cam surface fixedly mounted in one end thereof for engagement with the cam surface in the end of the locking sleeve to force the fingers of the locking sleeve outwardly to disconnect them from the groove and separate the conduits.

---

This invention pertains to apparatus for coupling ends of a pair of mating conduits in coaxial engagement and more particularly to coupling apparatus for efficiently locking the ends of a pair of mating conduits in coaxial engagement or unlocking said conduits for disengagement quickly and without the use of threaded portions or the like.

In prior art devices the coupling of a pair of mating conduits requires a threaded portion on each of the conduit ends which are threaded together to connect the conduits in abutting engagement and unthreaded to disconnect them. The threaded portions of the coupling mechanism require a great deal of manufacturing time and skill and the coupling process itself requires a great deal of time since the threads must be matched and the parts must be tightly threaded together. In many cases the parts are threaded together too tightly or too loosely in which cases they are either very difficult to get apart or a good connection is not made.

In the present invention the end of two mating conduits are coupled in coaxial engagement. Each of the conduits has a circumferential groove in the outer periphery and when the two conduits are in the correct engagement the grooves are spaced apart. In general one of the conduits has the locking apparatus attached thereto for engagement with the other conduit when the ends of the mating conduits are placed in coaxial engagement.

The locking apparatus consists of a locking sleeve having an inside diameter slightly larger than the outside diameter of the conduits. The locking sleeve also has two inwardly projecting flanges on the inner periphery thereof which are spaced apart for engagement with the spaced apart grooves in the mating conduits when the ends of the conduits are in coaxial engagement. Longitudinal slots extend from each end of the locking sleeve so that it consists of a plurality of spring-like fingers extending longitudinally from the center, each having a flange near the outer end thereof. It should be noted that a flange near the end of every finger is not required but the additional flanges add firmness to the coupling. The longitudinal slots provide radial movement of the flanges so that the locking sleeve may be slid over the outer periphery of the conduit until the flanges engage the circumferential grooves therein.

One of the flanges in the locking sleeve is generally maintained engaged with a groove in one of the conduits and when the conduits are placed in coaxial relationship and slid together the other flanges in the locking sleeve slides over the outer periphery of the other conduit and drops into engagement with the circumferential groove when the ends of the conduits are coaxially engaged. The end of the locking sleeve which slides over the conduit is tapered from approximately the outer diameter radially inwardly and longitudinally toward the other end thereof for ease in coupling and to aid in uncoupling, as will be explained later.

A hollow cylindrical actuating member normally encompasses the locking sleeve. The actuating member has a radially inwardly projecting shoulder at the end thereof which is farthest from the junction of the two conduits. The conduit on which the locking apparatus is mounted has a shoulder on the outer periphery thereof which engages with the flange on the actuating member to force the end of the conduit into coaxial engagement with the end of the other conduit when the actuating member is gripped and coaxially slid along the outer periphery of the other conduit.

The end of the actuating member not having a flange therein has a cam ring fixedly mounted therein by some means such as press fitting. The cam ring has an inner diameter which is slightly smaller than the outer diameter of the locking sleeve. The cam ring further has a cam surface projecting radially outwardly from the inner periphery and facing inwardly toward the center of the actuating member or toward the locking sleeve. The cam surface on the cam ring is so designed that it engages the tapered end of the locking sleeve which is slidably engaged with the second or connected conduit and forces that end of the locking sleeve radially outwardly as the actuating member is slid backward along the conduit upon which it is mounted. This causes the flange in the locking sleeve engaged in the groove in the second conduit to disengage from said groove, thereby, unlocking the conduits and allowing the first conduit to be uncoupled from the second conduit.

It is an object of this invention to provide an improved conduit coupling mechanism.

Another object of this invention is to provide a quick coupling and decoupling mechanism for conduits.

A further object of this invention is to provide a conduit coupling mechanism which is reliable and simple to construct.

These and other objects of this invention will become apparent to those skilled in the art upon consideration of the accompanying specification, claims, and drawings.

Referring to the drawings wherein like characters indicate like parts throughout the figures:

FIG. 1 is a view in perspective of the present invention completely assembled;

FIG. 2 is an exploded view in perspective of the present invention, parts broken away and shown in section;

FIG. 3 is an enlarged sectional view taken along the line 3—3 of FIG. 1, some parts shown in full; and FIG. 4 is an enlarged sectional view similar to FIG. 3, but showing it in the decoupling position, some parts shown in full.

Referring to FIG. 1 the numeral 10 indicates a first conduit having a square collar 11 thereon for purposes of fixedly mounting said conduit 10. The numeral 12 designates a second conduit the end of which is coupled in coaxial engagement with the end of the first conduit 10. In general the first conduit 10 is fixedly attached to some object, such as a mounting panel or the like, by means of the collar 11. The collar 11 is simply a convenience for a normal usage of the conduit and is not a part of the present invention. It should be understood that the conduits 10 and 12 could actually be integral portions of the conduits which are to be coupled together or they could simply be portions which are fixedly attached to the conduits by some means such as threads, welding, etc.

Referring to FIG. 2 it can be seen that the conduit 10 has a radially recessed portion 13 in the inner periphery thereof at the end which is to abut the conduit 12. The conduit 12 has a radially recessed portion 14 in the outer periphery thereof at the end which is to abut the conduit 10. The recessed portions 13 and 14 in conduits 10 and 12 are constructed so as to mate and when slidably engaged in coaxial relationship the conduits 10 and 12 form a smooth substantially unbroken conduit, as shown in FIGS. 3 and 4. The conduit 10 further has a circumferential groove 15 therein which is spaced from the end which abuts the conduit 12. The conduit 12 has a circumferential groove 16 therein which is spaced from the end which abuts the conduit 10.

A locking sleeve 20 having an inner diameter which is slightly larger than the outer diameter of the conduits 10 and 12 has a first flange 21 at one end thereof and a second flange 22 at the other end thereof. The flanges 21 and 22 are spaced apart the distance which the groove 16 is from the groove 15 when the ends of the conduits 10 and 12 are in the desired coaxial engaging relationship. It should be noted that while the flanges 21 and 22 are shown at the extreme ends of the locking sleeve 20 the distance between the flanges is the only requirement and they could actually be located anywhere in a locking sleeve, although locating them at the ends is the most efficient. The locking sleeve 20 has a plurality of longitudinal grooves 23 therein which extend from either end and provide the locking sleeve with a plurality of longitudinal fingers each having a flange at the end thereof. These fingers have a spring-like quality so that they may be radially extended to increase the circumference of either of the flanges 21 or 22.

The locking sleeve 20 is normally slid coaxially onto the conduit 12 so that the flange 21 engages the groove 16. The groove 16 has a somewhat square cross section and the flange 21 has a similar cross section with slightly smaller dimensions so that it engages the groove snugly. When the conduit 12 is to be coupled to the conduit 10 the locking sleeve 20 is placed coaxially over the conduit 10 and slid along the outer periphery thereof until the flange 22 engages the groove 15 at which time the ends of the conduit 10 and the conduit 12 are in partially overlying abutting engagement. The flange 22 has a cross section which is somewhat square with the addition of a surface having a cam-like cross section or a fillet from the edge of the flange 22 to the end of the locking sleeve 20. In addition the end portion of the locking sleeve 20 is tapered from the outer periphery radially inwardly and longitudinally toward the other end thereof to conform with the cam surface. The groove 15 has a similar cross section with slightly larger dimensions so that the flange 22 engages the groove 15 snugly.

An actuating member 30 is a hollow cylinder having an inner diameter slightly larger than the outer diameter of the locking sleeve 20 which slides over and encompasses the locking sleeve 20. An inwardly projecting flange 31 is located on the inner periphery of the actuating member 30 at the end which is toward the conduit 12. The flange 31 is constructed to abut the edge of an outwardly projecting circumferential shoulder 32 on the outer periphery of the conduit 12. The edge of the shoulder 32 which abuts the flange 31 during operation of the actuating member 30 is longitudinally spaced from the groove 16 and away from the end of the conduit 12 which abuts the conduit 10. As shown in FIG. 2 the shoulder 32 is actually of considerable width and contains the groove 16 therein.

To couple the conduit 12 to the conduit 10 the actuating member 30 is firmly gripped by the operator and the flange 22 in the locking sleeve 20 is placed coaxially against the conduit 10. As longitudinal force is applied to the actuating member 30 said member slides along the conduit 12 until the flange 31 abuts against the edge of the shoulder 32. As the longitudinal force is maintained the cam action of the flange 22 on the end of the conduit 10 forces the flange 22 radially outward and the locking sleeve 20 is slid along the outer surface of the conduit 10 until the flange 22 drops into engagement with the groove 15 at which time the mating surfaces 13 and 14 of the conduits 10 and 12 are in coaxial engagement. Portions of the activating member are shown knurled to aid in the gripping thereof.

A cam ring 35 is fixedly mounted in the end of the actuating member 30 opposite to the flange 31. Any convenient method of fixedly mounting the cam ring 35 in the activating member may be utilized and in the present embodiment the ring 35 is press fitted inside and coaxial with the actuating member 30. The cam ring 35 has a cam surface 36 thereon which extends radially outward from the inner periphery thereof. The ring 35 is mounted in the actuating member 30 so that the cam surface 36 faces the inner or center portion of the actuating member 30. The inner diameter of the cam ring 35 is slightly smaller than the outer diameter of the locking ring 20, so that the cam surface 36 engages the edge or the cam surface of the locking ring 20 when the actuating member 30 is forced longitudinally along the conduit 12 away from the conduit 10. It should be noted that the inner diameter of the cam ring 20 would have to be slightly smaller than the inner diameter of the locking sleeve 20 if the end surface were not tapered, as shown. As the actuating member 30 moves longitudinally along the conduit 12 the cam surface 36 on the ring 35 forces the flange 22 on the locking ring 20 radially outwardly, thereby, disenaging the flange 22 from the groove 15, as shown in FIG. 4. Once the flange 22 is disengaged from the groove 15 additional longitudinal force on the actuating member 30 will cause the conduit 12 to move longitudinally disengaging the mating surface 14 from the mating surface 13 and thereby uncoupling the conduit.

Thus, a coupling mechanism is disclosed which securely locks the ends of a pair of conduits in coaxial engagement with a single sliding movement of the mechanism. In addition the conduits may be uncoupled with a single sliding movement of the mechanism in the opposite direction. The disclosed coupling mechanism securely locks the ends of the pair of conduits in coaxial engagement and has the additional advantages of being simple to operate and simple to construct.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. Locking mechanism for coupling the ends of first and second mating conduits in coaxial engagement comprising:
   (a) a circumferential groove in the outer periphery of each of said mating conduits;
   (b) a shoulder extending radially outwardly from the periphery of said second conduit and directed away from the end which mates with the first conduit;
   (c) a locking sleeve having an inner diameter approximately equal to the outer diameters of said first and second conduits and having first and second spaced apart, inwardly projecting flanges on the inner surface thereof and longitudinal slots extending from either end thereof to provide radial movement of said flanges, for engagement of said flanges with said grooves when the ends of said conduits are coaxially engaged, and said locking sleeve having one end thereof tapered from approximately the outer periphery thereof radially inwardly and longitudinally toward the other end thereof;

(d) a hollow cylindrical actuating member with an inner diameter slightly larger than the outer diameter of said locking sleeve coaxially positioned so that one end of said actuating member encircles the end of said second conduit and having a flange extending radially inwardly adjacent said one end of said actuating member for abutting engagement with said shoulder on said second conduit; and (e) a cam ring coaxially affixed to the inner periphery of said actuating member adjacent the end opposite said one end thereof having an inner diameter slightly smaller than the outer diameter of said locking sleeve and having a cam surface at one end thereof extending radially outward for slidably engaging said tapered end of said locking sleeve and forcing radially outward said first flange thereby disengaging said first flange.

2. A coupler for conduit comprising:

(a) a first conduit having a radially recessed portion in the inner periphery at one end thereof and a circumferential groove in the outer periphery spaced from said one end thereof;

(b) a second conduit having a radially recessed portion in the outer periphery at one end thereof for coaxial mating engagement with said recessed portion in said first conduit and a circumferential groove in the outer periphery spaced from said one end thereof;

(c) a shoulder extending radially outwardly from the periphery of said second conduit and directed away from said one end which mates with the first conduit;

(d) a locking sleeve having an inner diameter approximately equal to the outer diameter of said first and second conduits and having first and second spaced apart inwardly projecting flanges on the inner surface thereof and longitudinal slots extending from either end thereof to provide radial movement of said flanges, said locking sleeve being fitted over said second conduit for concentric engagement of said second flange in said circumferential groove of said second conduit and concentric engagement of said first flange in said circumferential groove of said first conduit when said first and second conduits are placed in coaxial mating engagement, and said locking sleeve having one end thereof tapered from approximately the outer periphery thereof radially inwardly and longitudinally toward the other end thereof;

(e) a hollow cylindrical actuating member with an inner diameter slightly larger than the outer diameter of said locking sleeve coaxially positioned so that one end of said actuating member encircles the end of said second conduit and having a flange extending radially inwardly adjacent said one end of said actuating member for abutting engagement with said shoulder on said second conduit; and (f) a cam ring coaxially affixed attached to the inner periphery of said actuating member adjacent the end opposite said one end thereof having an inner diameter slightly smaller than the outer diameter of said locking sleeve and having a cam surface at one end thereof extending radially outward for slidably engaging said tapered end of said locking sleeve and forcing radially outward said first flange thereby disengaging said first flange.

References Cited

UNITED STATES PATENTS

| | | | |
|---|---|---|---|
| 1,815,660 | 7/1931 | Walker | 285—315 |
| 1,904,061 | 4/1933 | Larson | 285—319 X |
| 2,111,956 | 3/1938 | Baldwin | 285—39 X |
| 2,259,137 | 10/1941 | Iftiger | 285—35 |
| 2,452,219 | 10/1948 | Bergvall et al. | 285—322 X |
| 3,222,088 | 12/1965 | Haeber | 285—319 X |

FOREIGN PATENTS 847,163 6/1939 France.

CARL W. TOMLIN, *Primary Examiner.*

THOMAS F. CALLAGHAN, *Assistant Examiner.*